United States Patent
Koizumi et al.

(10) Patent No.: US 7,458,212 B2
(45) Date of Patent: Dec. 2, 2008

(54) BACK-PRESSURE VALVE AND ACTUATION SYSTEM

(75) Inventors: Takashi Koizumi, Gifu (JP); Toshio Kamimura, Gifu (JP)

(73) Assignee: Nabtesco Corporation, Tokyo (JP)

( * ) Notice: Subject to any disclaimer, the term of this patent is extended or adjusted under 35 U.S.C. 154(b) by 594 days.

(21) Appl. No.: 11/070,076

(22) Filed: Mar. 2, 2005

(65) Prior Publication Data

US 2005/0193887 A1    Sep. 8, 2005

(30) Foreign Application Priority Data

Mar. 3, 2004    (JP)    ............................. 2004-059259

(51) Int. Cl.
   *F16D 31/02*    (2006.01)
   *F15B 13/04*    (2006.01)
(52) U.S. Cl. .......................................... 60/461; 91/463
(58) Field of Classification Search ................... 91/463, 91/DIG. 2; 60/460, 461; 137/508, 509
   See application file for complete search history.

(56) References Cited

U.S. PATENT DOCUMENTS 5,343,703 A * 9/1994 Kamimura .................... 91/461
5,597,012 A * 1/1997 Moinard ...................... 137/508

FOREIGN PATENT DOCUMENTS

| EP | 0 343 116 A2 | 11/1989 |
| FR | 1 499 255 | 10/1967 |
| GB | 518482 | 2/1940 |
| GB | 947170 | 1/1964 |
| JP | 2-34872 U | 3/1990 |
| JP | 07-042857 A | 2/1995 |
| JP | 08-226404 A | 9/1996 |
| JP | 09-144713 A | 6/1997 |
| JP | 09-328098 A | 12/1997 |
| WO | WO 87/06319 A1 | 10/1987 |

* cited by examiner

*Primary Examiner*—Michael Leslie
(74) *Attorney, Agent, or Firm*—Panitch Schwarze Belisario & Nadel LLP

(57) ABSTRACT

A back-pressure valve comprises a case having first and second oil chambers through which oil passes. A piston is slidably accommodated within the case to partition the first oil chamber and the second oil chamber. A spring urges the piston in a sliding direction. A projecting member and a check valve allow the first oil chamber to communicate with the second oil chamber when the pressure of the oil in the first fluid chamber reaches a predetermined pressure. An area of the piston on which oil pressure is received in the first oil chamber is made lager than an area on which oil pressure is received in the second oil chamber. A part of the piston located at an end thereof opposite to the end thereof which faces the first oil chamber communicates with the outside of the case.

5 Claims, 3 Drawing Sheets

BACK-PRESSURE VALVE AND ACTUATION SYSTEM

BACKGROUND OF THE INVENTION

1. Field of the Invention

The present invention relates to a back-pressure valve for applying a back pressure to an actuator or the like.

2. Description of the Related Art

There is known a pressure accumulator having a relief valve as a conventional back-pressure valve. See, for example, Japanese Patent Publication No. JP-A-9-328098 (Page 7, FIG. 1).

In the conventional back-pressure valve, however, since there is generated a difference in hydraulic pressure between before and after the passage through the back-pressure valve, there has been caused a problem that hydraulic energy is lost.

Furthermore, in the conventional back-pressure valve, since a predetermined pressure for a relief valve is set larger than a desired predetermined pressure therefor to some extent in order to ensure the accumulation of the desired predetermined pressure, there has been caused a problem that the loss of hydraulic energy is increased.

SUMMARY OF THE INVENTION

The invention was made with a view to solving the problem inherent in the conventional back-pressure valve and an object thereof is to provide a back-pressure valve which can reduce the loss of fluid energy further when compared with the conventional example.

According to a first aspect of the invention, there is provided a back-pressure valve comprising a case through which fluid passes and in the interior of which a first fluid chamber and a second fluid chamber are defined, a piston slidably accommodated within the case so as to partition the first fluid chamber and the second fluid chamber, an elastic member for urging the piston in a sliding direction thereof, and a communication device for allowing the first fluid chamber to communicate with the second fluid chamber when the pressure of the fluid in the first fluid chamber reaches a predetermined pressure, wherein an area of the piston on which fluid pressure is received in the first fluid chamber is made lager than an area thereof on which fluid pressure is received in the second fluid chamber, and wherein part of an opposite side of the piston with respect to the first fluid chamber is made to communicate with the outside of the case.

According to the construction, since the area of the piston on which fluid pressure is received in the first fluid chamber is larger than the area thereof on which fluid pressure is received in the second fluid chamber and a part of the piston which is opposite to the first fluid chamber is made to communicate with the outside of the case, the generation of a difference in pressure of the fluid between before and after the passage through the back-pressure valve can be suppressed, thereby making it possible to reduce the loss of fluid energy further when compared with the conventional example.

In addition, according to a second aspect of the invention, the piston has a check valve for preventing the passage of the fluid from the first fluid chamber to the second fluid chamber and a relief valve for allowing the first fluid chamber to communicate with the second fluid chamber when the pressure of the fluid in the first fluid chamber has reached a predetermined pressure which is larger than the predetermined pressure, and the communication device has the check valve and a valve-opening member adapted to be brought into contact with the check valve so as to open the check valve when the piston is located at a predetermined position.

According to the construction, since the back-pressure valve of the invention allows the first fluid chamber to communicate with the second fluid chamber the instant the pressure of the fluid in the first fluid chamber has reached the predetermined pressure, the loss of fluid energy can be reduced further.

According to a third aspect of the invention, there is provided a back-pressure valve comprising a case through which fluid passes and in the interior of which a first fluid chamber and a second fluid chamber are formed, a piston slidably accommodated within the case so as to partition the first fluid chamber and the second fluid chamber, an elastic member for urging the piston in a sliding direction of thereof, and a communication device for allowing the first fluid chamber to communicate with the second fluid chamber when the pressure of the fluid in the first fluid chamber has reached a predetermined pressure, wherein the piston has a check valve for preventing the passage of the fluid from the first fluid chamber to the second fluid chamber and a relief valve for allowing the first fluid chamber to communicate with the second fluid chamber when the pressure of the fluid in the first fluid chamber reaches a predetermined pressure which is larger than the predetermined pressure, and wherein the communication device has the check valve and a valve-opening member adapted to be brought into contact with the check valve so as to open the check valve when the piston is located at a predetermined position.

According to the construction, since the back-pressure valve of the invention allows the first fluid chamber to communicate with the second fluid chamber the instant the pressure of the fluid in the first fluid chamber has reached the predetermined pressure, the loss of fluid energy can be reduced further when compared with the conventional example.

According to a fourth aspect of the invention, there is provided an actuation system comprising a back-pressure valve according to any of the first to third aspect of the invention, an actuator driven by the fluid, and a pressurizing means for pressurizing the fluid in the second fluid chamber, wherein the actuator has a discharge port formed therein to discharge the fluid therefrom, and wherein the discharge port is made to communicate with the first fluid chamber.

According to the construction, the actuation system of the invention can apply a back pressure to the actuator while reducing the wasteful loss of fluid energy when compared with the conventional example.

According to the invention, there can be provided the back-pressure valve which can reduce the loss of fluid energy further when compared with the conventional example.

DETAILED DESCRIPTION OF THE PREFERRED EMBODIMENTS

Embodiments of the invention will be described below by reference to the accompanying drawings.

First Embodiment

Firstly, the construction of an actuation system according to a first embodiment of the invention will be described.

Figure 1:
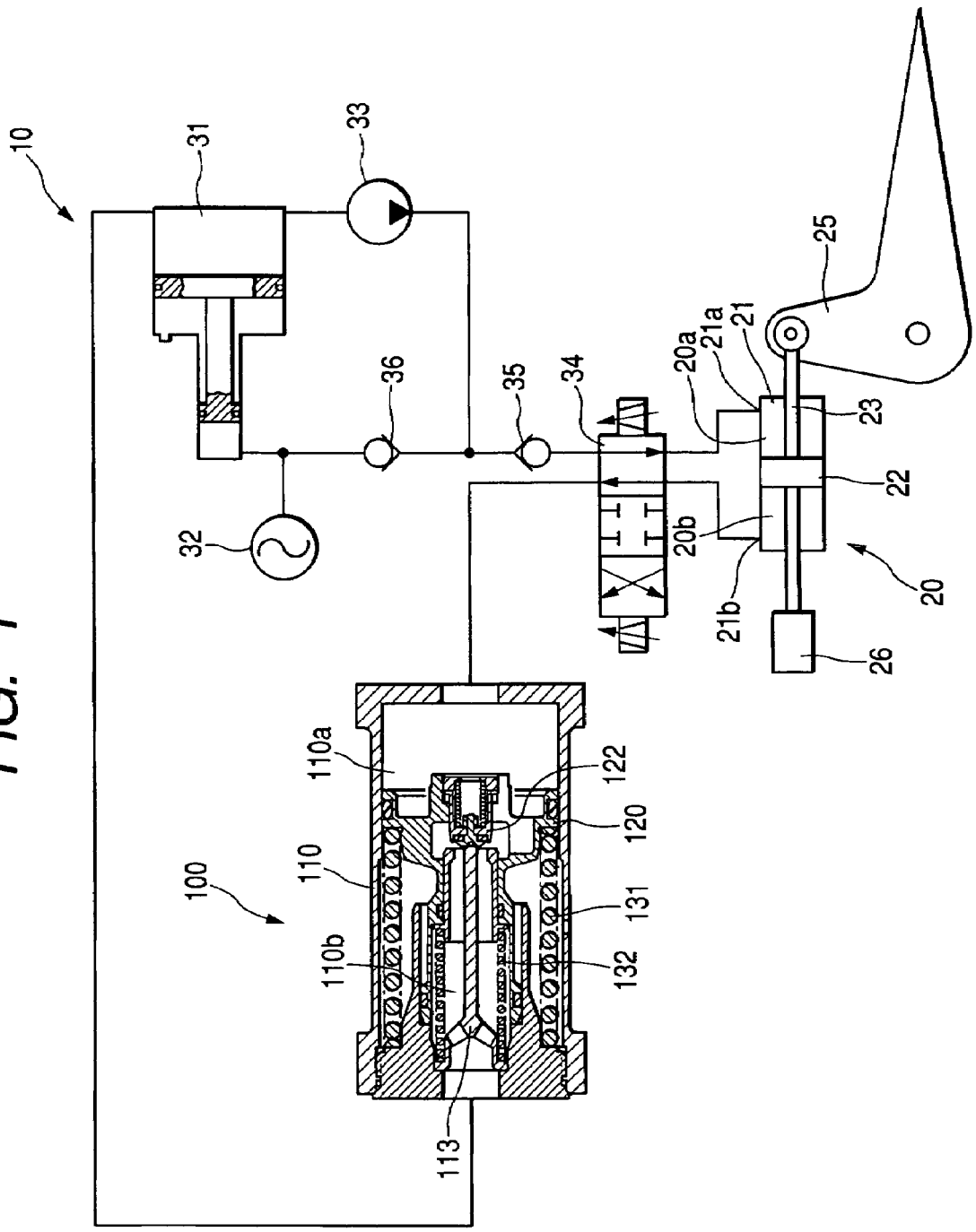
FIG. 1 is a block diagram illustrating the construction of an actuation system according to a first embodiment of the invention.

As shown in FIG. 1, an actuation system 10 according to the embodiment of the invention includes a hydraulic cylinder 20 which is an actuator driven by virtue of oil. Here, the hydraulic cylinder 20 has a cylinder case 21, a piston 22 which is slidably accommodated within the cylinder case 21 and a piston rod 23 which is formed integrally with the piston 22. In addition, in the hydraulic cylinder 20, a cylinder chamber 20a and a cylinder chamber 20b are defined by the cylinder case 21 and the piston 22. Additionally, in the cylinder case 21, there are formed a supply/discharge port 21a which functions both as a supply port through which oil is supplied into the cylinder chamber 20a and a discharge port through which oil is discharged from the cylinder chamber 20a and a supply/discharge port 21b which functions both as a supply port through which oil is supplied into the cylinder chamber 20b and a discharge port through which oil is discharged from the cylinder chamber 20b.

In addition, the actuation system 10 includes a posture-control wing 25 such as an elevator or a rudder of an aircraft which is rotatably connected to an end of the piston rod 23 of the hydraulic cylinder 20 which is located on the cylinder chamber 20a side, a sensor 26 mounted on an end of the piston rod 23 of the hydraulic cylinder 20 which is located on the cylinder chamber 20b side for detecting the position of the piston 22, a tank 31 which stores oil discharged from the hydraulic cylinder 20, an accumulator 32 which functions as a pressurizing device for pressurizing the oil in the tank 31, a pump 33 for supplying the oil stored in the tank 31 to the hydraulic cylinder 20, an electromagnetic switching valve 34 for switching over the supply and discharge state of oil to and from the hydraulic cylinder 20, a check valve 35 for preventing the passage of oil from the electromagnetic switching valve 34 side to the pump 33 side, a check valve 36 for preventing the passage of oil from the accumulator 32 side to the pump 33 side and a back-pressure valve 100 for applying a back pressure to the hydraulic cylinder 20.

Figure 2:
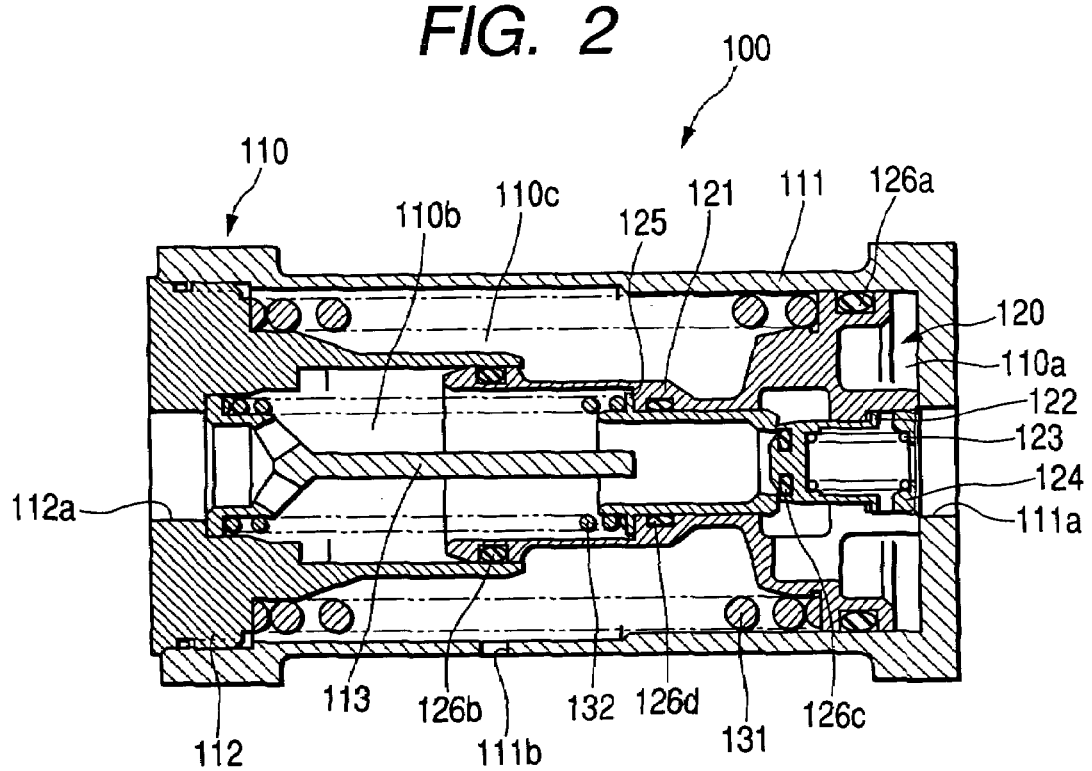
FIG. 2 is a block diagram illustrating the construction of a back-pressure valve shown in FIG. 1 with a check valve being closed.

Here, as shown in FIG. 2, the back-pressure valve 100 includes a case 110, a piston 120 accommodated slidably within the case 110 and a spring 131 and a spring 132 both of which function as an elastic member for urging the piston 120 in a sliding direction thereof.

Here, the case 110 has a first member 111 in which a hole 111a and a hole 111b are formed, a second member 112 which is fitted in the first member 111 and in which a hole 112a is formed and a projecting member 113 accommodated in the interior of the second member 112. In addition, in the case 110, there are defined an oil chamber 110a as a first fluid chamber which is partitioned by the piston 120 and which communicates with the hole 111a in the first member 111, an oil chamber 110b as a second fluid chamber which is partitioned by the piston 120 and which communicates with the hole 112a in the second member 112 and an atmospheric chamber 110c which is partitioned by the piston 120 and which communicates with the atmosphere outside the case 110 via the hole 111b in the first member 111.

In addition, the piston 120 has a main body 121 which is urged to the oil chamber 110a side by means of the spring 131, a check valve 122 which is slidably accommodated in the main body 121, a spring 123 for urging the check valve 122 to the oil chamber 110b side, a cap 124 fitted in the main body 121 for holding the spring 123, a relief valve 125 which is accommodated slidably in the main body 121 and which is urged to the oil chamber 110a side by means of the spring 132, a seal member 126a mounted on the main body 121 for preventing the leakage of oil between the main body 121 and the first member 111 of the case 110, a seal member 126b mounted on the main body 121 for preventing the leakage of oil between the main body 121 and the second member 112 of the case 110, a seal member 126c mounted on the check valve 122 for preventing the leakage of oil between the check valve 122 and the relief valve 125 and a seal member 126d mounted on the main body 121 for preventing the leakage of oil between the main body 121 and the relief valve 125.

Here, an area A1 of the piston 120 on which oil pressure is received in the oil chamber 110a is larger than an area B1 of the piston 120 on which oil pressure is received in the oil chamber 110b. In addition, part of the piston 120 which is located at an end of the piston 120 which is opposite to the other end thereof which faces the oil chamber 110a is made to communicate with the atmosphere outside the case 110 via the atmospheric chamber 110c and the hole 111b of the case 110.

In addition, the check valve 122 is designed to prevent the passage of oil from the oil chamber 110a to the oil chamber 110b by being urged to the oil chamber 110b side by means of the spring 123.

Additionally, the relief valve 125 is designed to allow the oil chamber 110a to communicate with the oil chamber 110b when the pressure of oil in the oil chamber 110a has reached a predetermined pressure which is larger than a predetermined pressure for the back-pressure valve 100 by being urged to the oil chamber 110a side by means of the spring 132.

Figure 3:
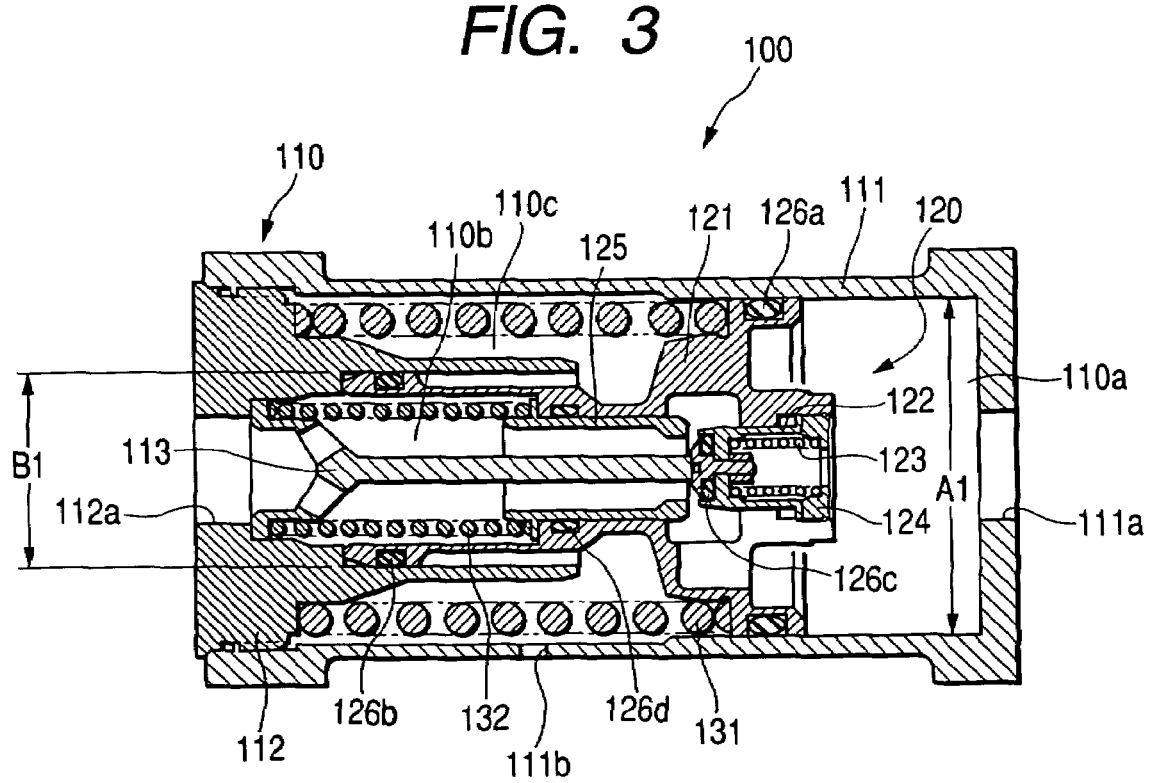
FIG. 3 is a block diagram illustrating the construction of the back-pressure valve shown in FIG. 1 with the check valve being opened.

Note that the projecting member 113 of the case 110 is designed to be brought into contact with the check valve 122, as shown in FIG. 3, so as to open the check valve 122 when the piston 120 occupies a position where the piston 120 is located closest to the hole 112a and constitutes a valve opening member.

Here, in the back-pressure valve 100, the area A1 of the piston 120 on which oil pressure is received in the oil chamber 110a, the area B1 of the piston 120 on which oil pressure is received in the oil chamber 110b and the elastic forces of the spring 131 and the spring 132 are selected such that the piston 120 occupies the position where the piston 120 is located closest to the hole 112a. Namely, the projecting member 113 and the check valve 122 constitute a communication device for allowing the oil chamber 110a to communicate with the oil chamber 110b when the pressure of oil in the oil chamber 110a has reached the predetermined pressure of the back-pressure valve 100.

Note that in the back-pressure valve 100, the oil chamber 110a communicates with the supply/discharge port 21a or the supply/discharge port 21b of the hydraulic cylinder 20 via the electromagnetic switching valve 34 and oil in the oil chamber 110b is pressurized by the tank 31 which is pressurized by the accumulator 32.

Next, the operation of the actuation system 10 will be described.

When a signal generated in a controller, not shown, based on an indication by the operator or a detection valve of the sensor 26 is inputted into the electromagnetic switching valve 34, in response to the signal so inputted, the electromagnetic switching valve 34 allows the pump 33 to communicate with the supply/discharge port 21a of the hydraulic cylinder 20 so as to allow the supply/discharge port 21b of the hydraulic cylinder 20 to communicate with the hole 111a in the back-pressure valve 100 or allows the pump 33 to communicate with the supply discharge port 21b of the hydraulic cylinder 20 so as to allow the supply/discharge port 21a of the hydraulic cylinder 20 to communicate with the hole 111a in the back-pressure valve 100.

Here, when the pump 33 communicates with the supply/discharge port 21a of the hydraulic cylinder 20 to thereby allow the supply/discharge port 21a of the hydraulic cylinder 20 to communicate with the hole 111a in the back-pressure valve 100, the piston 22 in the hydraulic cylinder 20 is shifted to the cylinder chamber 20b side by virtue of oil supplied from the pump 33, whereby oil in the cylinder chamber 20b is supplied to the oil chamber 110a of the back-pressure valve 100, while being pressurized by the back-pressure valve 100. In addition, when the pump 33 communicates with the supply/discharge port 21b of the hydraulic cylinder 20 to thereby allow the supply/discharge port 21a of the hydraulic cylinder 20 to communicate with the hole 111a in the back-pressure valve 100, the piston 22 in the hydraulic cylinder.20 is shifted to the cylinder chamber 20a side by virtue of oil supplied from the pump 33, whereby oil in the cylinder chamber 20a is supplied to the oil chamber 110a of the back-pressure valve 100, while being pressurized by the back-pressure valve 100.

In the back-pressure 100, when oil is supplied into the oil chamber 110a, the piston 120 is shifted from a state shown in FIG. 2 to the oil chamber 110b side, and the check valve 122 is opened by the projecting member 113, whereby a state shown in FIG. 3 results.

Since, when the back-pressure valve 100 is put in the state shown in FIG. 3, the oil chamber 110a and the oil chamber 110b of the back-pressure valve 100 are allowed to communicate with each other, a back pressure due to the tank 31 which is pressurized by the accumulator 32 is applied to the hydraulic cylinder 20 via the back-pressure valve 100. Consequently, according to the actuation system 10, since the entrainment of air into oil in a hydraulic pressure circuit between the oil chamber 110a of the back-pressure valve 100 and the hydraulic cylinder 20 can be prevented, the vibration of the piston 22 of the hydraulic cylinder 20 resulting from the entrainment of air into the oil can be prevented, and hence the flutter of the posture-control wing 25 can be suppressed.

Note that since, when the back-pressure valve 100 is in the state shown in FIG. 3, the oil chamber 110a and the oil chamber 110b of the back-pressure valve 100 communicate with each other, the pressure of oil in the oil chamber 110a and the pressure of oil in the oil chamber 110b are equal. Consequently, assuming that a resultant of the urging forces of the spring 131 and the spring 132 is F, the pressure of oil in the oil chamber 110a and the oil chamber 110b is Po, the atmospheric pressure is Pa, the area A1 of the piston 120 on which oil pressure is received in the oil chamber 110a is A1 and the area of the piston 120 on which the oil pressure is received in the oil chamber 110b is B1, a relation designated by Equation No. 1 is established, and a relation designated by Equation No. 2 is established as to the resultant F.

$$F + Po \times B1 + Pa \times (A1-B1) \leq Po \times A1 \quad \text{Equation No. 1}$$

$$F \leq (Po-Pa) \times (A1-B1) \quad \text{Equation No. 2}$$

Namely, in the back-pressure valve 100, the spring 131 and the spring 132 can be used as springs which can urge the piston 120 with such a large force that the back-pressure valve 100 can supply by itself a sufficient back pressure to the hydraulic cylinder 20 even in case no oil is supplied to the hydraulic cylinder 20 due to a failure in the pump 33 or no back pressure is supplied from the tank 31 due to a failure in the oil path. Consequently, according to the back-pressure valve 100, the flutter of the posture-control wing 25 can be suppressed even in case there occurs expansion and contraction of oil due to a change in oil temperature or a leakage of oil when no oil is supplied to the hydraulic cylinder 20 due to a failure in the pump 33 or no back pressure is supplied from the tank 31 due to a failure in the oil path.

In addition, according to the actuation system 10, since the check valve 122 is shifted to the hole 111a side to thereby be opened by virtue of the back-pressure due to the tank 31 which is pressurized by the accumulator 32 even when there exists no pressure accumulated in the back-pressure valve 100, whereby the back-pressure valve 100 is put in the state shown in FIG. 2, the back pressure due to the tank 31 pressurized by the accumulator 32 can be applied to the hydraulic cylinder 20, thereby making it possible to suppress the flutter of the posture-control wing 25.

Furthermore, according to the actuation system 10, even in case the piston 120 is fixed to the case 110 due to a jamming occurring between the piston 120 and the case 110 in a state where the check valve 122 of the back-pressure valve 100 is not in contact with the projecting member 113, the relief valve 125 can be opened with the oil in the oil chamber 110a. Namely, the actuation system 10 can prevent the hydraulic cylinder 20 from being made inoperable when the piston 120 is fixed to the case 110 in the state where the check valve 122 of the back-pressure valve 100 is not in contact with the projecting member 113.

Thus, as has been described heretofore, since in the back-pressure valve 100, the area A1 of the piston 120 on which oil pressure is received in the oil chamber 110a is larger than the area B1 of the piston 120 on which oil pressure is received in the oil chamber 110b and the part of the piston 120 which is located at the end of the piston 120 which is opposite to the other end thereof which faces the oil chamber 110a is made to communicate with the atmosphere outside the case 110, the difference in pressure of oil can be suppressed which is generated between before and after the passage of oil through the back-pressure valve 100 when oil is normally supplied to the hydraulic cylinder 20 by the pump 33 and the back pressure due to the tank 31 which is pressurized by the accumulator 32 is normally supplied to the hydraulic cylinder 20, and the loss of hydraulic energy can be reduced further when compared with the conventional example.

Consequently, the actuation system 10 can apply the back pressure to the hydraulic cylinder 20 while reducing the wasteful loss of the hydraulic energy further when compared with the conventional example.

In addition, according to the actuation system 10, since the oil chamber 110a and the oil chamber 110b are allowed to communicate with each other by the check valve 122 and the projecting member 113 the instant the pressure of the oil in the oil chamber 110a has reached the predetermined pressure, the loss of hydraulic energy can be reduced further when compared with the conventional example.

Additionally, according to the actuation system 10, since the piston 120 of the back-pressure valve 100 does not slide relative to the case 110 after the back-pressure valve 100 has been put in the state shown in FIG. 3 when oil is normally supplied to the hydraulic cylinder 20 by the pump 33 and the back pressure due to the tank 31 which is pressurized by the accumulator 32 is normally supplied to the hydraulic cylinder 20, the durability of the back-pressure valve 100 can be reduced when compared with the conventional example, and as a result, the production costs and weight of the back-pressure valve 100 can be reduced further when compared with the conventional example.

Furthermore, according to the actuation system 10, since the pump 33 is pressurized by the accumulator 32 and the check valve 36 not only when the pump 33 is driven but also when the pump 33 is stopped, the generation of cavitation can be prevented which occurs on a suction side of the pump 33 when the pump 33 is started to be driven, thereby making it possible to extend the life of the pump 33.

Second Embodiment

Firstly, the construction of an actuation system according to a second embodiment will be described. Note that according to the construction of the actuation system of this embodiment, the actuation system 10 (refer to FIG. 1) includes a back-pressure valve 200 shown in FIG. 4 in place of the back-pressure valve 100 (refer to FIG. 1).

The back-pressure valve 200 includes a case 210, a piston 220 accommodated slidably within the case 210 and a spring 231 which functions as an elastic member for urging the piston 220 in a sliding direction thereof.

Here, the case 210 has a first member 211 in which a hole 211a and a hole 211b are formed, a second member 212 which is fitted in the first member 211 and in which a hole 212a is formed, a projecting member 213 accommodated in the interior of the second member 212 and a stopper 214 for fixing the projecting member 213 to the second member 212. In addition, in the case 210, there are defined an oil chamber 210a as a first fluid chamber which is partitioned by the piston 220 and which communicates with the hole 211a in the first member 211, an oil chamber 210b as a second fluid chamber which is partitioned by the piston 220 and which communicates with the hole 212a in the second member 212 and an atmospheric chamber 210c which is partitioned by the piston 220 and which communicates with the atmosphere outside the case 210 via the hole 211b in the first member 211.

In addition, the piston 220 has a main body 221 which is urged to the oil chamber 210a side by means of the spring 231, a check valve 222 which is slidably accommodated in the main body 221, a spring 223 for urging the check valve 222 to the oil chamber 210b side, a cap 224 fitted in the main body 221 for holding the spring 223, a seal member 226a mounted on the main body 221 for preventing the leakage of oil between the main body 221 and the first member 211 of the case 210, a seal member 226b mounted on the main body 221 for preventing the leakage of oil between the main body 221 and the second member 212 of the case 210, and a seal member 226c mounted on the check valve 222 for preventing the leakage of oil between the main body 221 and the check valve 222.

Here, an area A2 of the piston 220 on which oil pressure is received in the oil chamber 210a is larger than an area B2 of the piston 220 on which oil pressure is received in the oil chamber 210b. In addition, part of the piston 220 which is located at an end of the piston 220 which is opposite to the other end thereof which faces the oil chamber 210a is made to communicate with the atmosphere outside the case 210 via the atmospheric chamber 210c and the hole 211b of the case 210.

In addition, the check valve 222 is designed to prevent the passage of oil from the oil chamber 210a to the oil chamber 210b by being urged to the oil chamber 210b side by means of the spring 223.

Figure 4:
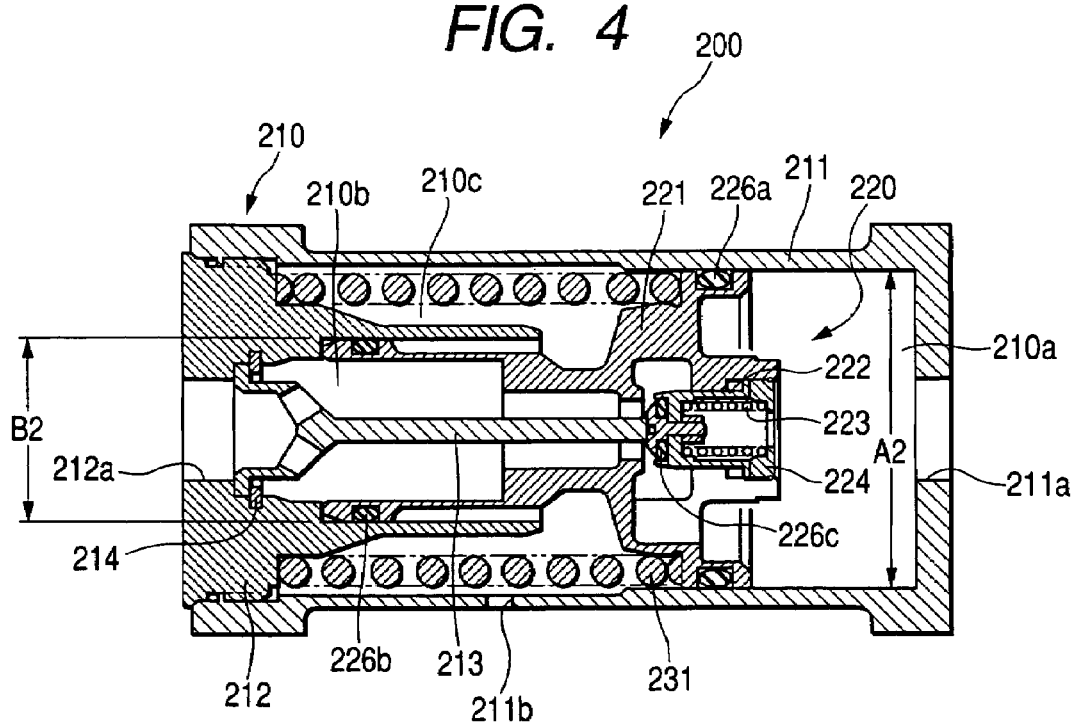
FIG. 4 is a block diagram illustrating the construction of a back-pressure valve for an actuation system according to a second embodiment of the invention with a check valve being opened.

Note that the projecting member 213 of the case 210 is designed to be brought into contact with the check valve 222, as shown in FIG. 4, so as to open the check valve 222 when the piston 220 occupies a position where the piston 220 is located closest to the hole 212a.

Here, in the back-pressure valve 200, the area A2 of the piston 220 on which oil pressure is received in the oil chamber 210a, the area B2 of the piston 220 on which oil pressure is received in the oil chamber 210b and the elastic force of the spring 231 are selected such that the piston 220 occupies the position where the piston 220 is located closest to the hole 212a. Namely, the projecting member 213 and the check valve 222 constitute a communication device for allowing the oil chamber 210a to communicate with the oil chamber 210b when the pressure of oil in the oil chamber 210a has reached the predetermined pressure of the back-pressure valve 200.

Note that in the back-pressure valve 200, the oil chamber 210a communicates with the supply/discharge port 21a or the supply/discharge port 21b of the hydraulic cylinder 20 via the electromagnetic switching valve 34 and oil in the oil chamber 210b is pressurized by the tank 31 which is pressurized by the accumulator 32.

Next, the operation of the actuation system according to the embodiment will be described.

In the actuation system according to the embodiment of the invention, by a similar operation of the back-pressure valve 200 to that of the back-pressure valve 100 when oil is normally supplied to the hydraulic cylinder 20 by the pump 31 and the back pressure due to the tank 31 pressurized by the accumulator 32 is normally supplied to the hydraulic cylinder 20, the flutter of the posture-control wing 25 can be suppressed by virtue of a back pressure due to the tank 31 which is pressurized by the accumulator 32.

In addition, in the actuation system according to the embodiment, by a similar operation of the back-pressure valve 200 to that of the back-pressure valve 100, the back-pressure valve 200 can suppress the flutter of the posture-control wing 25 by virtue of the back pressure of the back-pressure valve 200 itself even in case there occurs expansion and contraction of oil due to a change in oil temperature or a leakage of oil occurs when no oil is supplied to the hydraulic cylinder 20 due to a failure in the pump 33 or no back pressure is supplied from the tank 31 due to a failure in the oil path.

In addition, according to the actuation system of the embodiment, since the check valve 222 is shifted to the hole 211a side to thereby be opened by virtue of the back-pressure due to the tank 31 which is pressurized by the accumulator 32 even when there exists no pressure accumulated in the back-pressure valve 200, whereby the piston 220 of the back-pressure valve 200 is shifted to a position where the piston 220 is located closest to the oil chamber 210a, the back pressure due to the tank 31 pressurized by the accumulator 32 can be applied to the hydraulic cylinder 20, thereby making it possible to suppress the flutter of the posture-control wing 25.

Thus, as has been described heretofore, since in the back-pressure valve 200, the area A2 of the piston 220 on which oil pressure is received in the oil chamber 210a is larger than the area B2 of the piston 220 on which oil pressure is received in the oil chamber 210b and the part of the piston 120 which is located at the end of the piston 220 which is opposite to the other end thereof which faces the oil chamber 210a is made to communicate with the atmosphere outside the case 210, the difference in pressure of oil can be suppressed which is generated between before and after the passage of oil through the back-pressure valve 200 when oil is normally supplied to the hydraulic cylinder 20 by the pump 33 and the back pressure due to the tank 31 which is pressurized by the accumulator 32 is normally supplied to the hydraulic cylinder 20, and the loss of hydraulic energy can be reduced further when compared with the conventional example.

Consequently, the actuation system according to the embodiment can apply the back pressure to the hydraulic cylinder 20 while reducing the wasteful loss of the hydraulic energy further when compared with the conventional example.

In addition, according to the back-pressure valve 200, the oil chamber 210a and the oil chamber 210b are allowed to communicate with each other by the check valve 222 and the projecting member 213 the instant the pressure of the oil in the oil chamber 210a has reached the predetermined pressure, the loss of hydraulic energy can be reduced further when compared with the conventional example.

Additionally, with the actuation system according to the embodiment, since the piston 220 of the back-pressure valve 200 does not slide relative to the case 210 after the back-pressure valve 200 has been put in the state shown in FIG. 4 when oil is normally supplied to the hydraulic cylinder 20 by the pump 33 and the back pressure due to the tank 31 which is pressurized by the accumulator 32 is normally supplied to the hydraulic cylinder 20, the durability of the back-pressure valve 200 can be reduced when compared with the conventional example, and as a result, the production costs and weight of the back-pressure valve 200 can be reduced further when compared with the conventional example.

Furthermore, with the actuation system according to the embodiment, since the pump 33 is pressurized by the accumulator 32 and the check valve 36 not only when the pump 33 is driven but also when the pump 33 is stopped, the generation of cavitation can be prevented which occurs on a suction side of the pump 33 when the pump 33 is started to be driven, thereby making it possible to extend the life of the pump 33.

Third Embodiment

Firstly, the construction of an actuation system according to a third embodiment will be described. Note that according to the construction of the actuation system of this embodiment, the actuation system 10 (refer to FIG. 1) includes a back-pressure valve 300 shown in FIG. 5 in place of the back-pressure valve 100 (refer to FIG. 1).

The back-pressure valve 300 includes a case 310, a piston 320 accommodated slidably within the case 310 and a spring 331 and a spring 332 both of which function as an elastic member for urging the piston 320 in a sliding direction thereof.

Here, as shown in FIG. 2, the back-pressure valve 100 includes a case 110, a piston 120 accommodated slidably within the case 110 and a spring 131 and a spring 132 both of which function as an elastic member for urging the piston 120 in a sliding direction thereof.

Here, the case 310 has a first member 311 in which a hole 311a and a hole 311b are formed and a second member 312 which is fitted in the first member 311 and in which a hole 312a is formed. In addition, in the case 310, there are defined an oil chamber 310a as a first fluid chamber which is partitioned by the piston 320 and which communicates with the hole 311a in the first member 311, an oil chamber 310b as a second fluid chamber which is partitioned by the piston 320 and which communicates with the hole 312a in the second member 312 and an atmospheric chamber 310c which is partitioned by the piston 320 and which communicates with the atmosphere outside the case 310 via the hole 311b in the first member 311.

In addition, the piston 320 has a main body 321 which is urged to the oil chamber 310a side by means of the spring 331, a relief valve 325 which is accommodated slidably in the main body 321 and which is urged to the oil chamber 310a side by means of the spring 332, a seal member 326a mounted on the main body 321 for preventing the leakage of oil between the main body 321 and the first member 311 of the case 310, a seal member 326b mounted on the main body 321 for preventing the leakage of oil between the main body 321 and the second member 312 of the case 310, a seal member 326c mounted on the main body 321 for preventing the leakage of oil between the main body 321 and the relief valve 325.

Here, an area A3 of the piston 320 on which oil pressure is received in oil chamber 310a is larger than an area B3 of the piston 320 on which oil pressure is received in the oil chamber 310b. In addition, part of the piston 320 which is located at an end of the piston 320 which is opposite to the other end thereof which faces the oil chamber 310a is made to communicate with the atmosphere outside the case 310 via the atmospheric chamber 310c and the hole 311b of the case 310.

In addition, the relief valve 325 is designed to allow the oil chamber 310a to communicate with the oil chamber 310b when the pressure of oil in the oil chamber 310a has reached a predetermined pressure which is larger than a predetermined pressure for the back-pressure valve 300 by being urged to the oil chamber 310a side by means of the spring 332.

Here, in the back-pressure valve 300, the area A3 of the piston 320 on which oil pressure is received in the oil chamber 310a, the area B3 of the piston 320 on which oil pressure is received in the oil chamber 310b and the elastic forces of the spring 331 and the spring 332 are selected such that the piston 320 occupies the position where the piston 320 is located closest to the hole 312a. Namely, the relief valve 325 constitutes a communication device for allowing the oil chamber 310a to communicate with the oil chamber 310b when the pressure of oil in the oil chamber 310a has reached the predetermined pressure of the back-pressure valve 300.

Note that in the back-pressure valve 300, the oil chamber 310a communicates with the supply/discharge port 21a or the supply/discharge port 21b of the hydraulic cylinder 20 via the electromagnetic switching valve 34 and oil in the oil chamber 310b is pressurized by the tank 31 which is pressurized by the accumulator 32.

Next, the operation of the actuation system according to the embodiment will be described.

When a signal generated in a controller, not shown, based on an indication by the operator or a detection valve of the sensor 26 is inputted into the electromagnetic switching valve 34, as has occurred in the actuation system 10, oil in the hydraulic cylinder 20 is supplied to the oil chamber 310a of the back-pressure valve 300 while being pressurized by the back-pressure valve 300.

Figure 5:
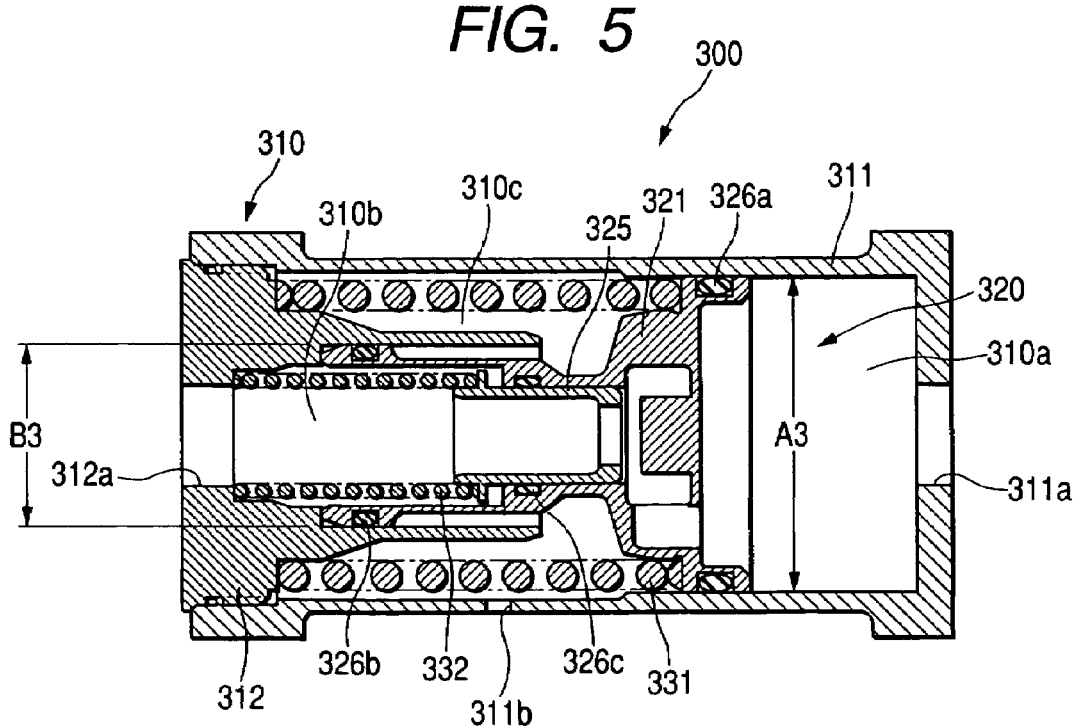
FIG. 5 is a block diagram illustrating the construction of a back-pressure valve for an actuation system according to a third embodiment of the invention with a relief valve being opened.

In the back-pressure 300, when oil is supplied into the oil chamber 310a, after the piston 320 is shifted to the oil chamber 310b side to be at a position where the piston 320 is located closest to the hole 312a side and when the pressure of the oil within the oil chamber 310a has reached the predetermined pressure which is larger than the predetermined pressure of the back-pressure valve 300, the relief valve 325 is opened to be in a state shown in FIG. 5 by virtue of the oil within the oil chamber 310a.

When the back-pressure valve 300 opens the relief valve 325, in the actuation system according to the invention, as has occurred in the actuation system 10, the flutter of the posture-control wing 25 can be suppressed by the back pressure by the tank 31 pressurized by the accumulator 32.

In addition, in the actuation system according to the embodiment, by a similar operation of the back-pressure valve 300 to that of the back-pressure valve 100, the back-pressure valve 300 can suppress the flutter of the posture-control wing 25 by virtue of the back pressure of the back-pressure valve 300 itself even in case there occurs expansion and contraction of oil due to a change in oil temperature or a leakage of oil occurs when no oil is supplied to the hydraulic cylinder 20 due to a failure in the pump 33 or no back pressure is supplied from the tank 31 due to a failure in the oil path.

Furthermore, with the actuation system according to the embodiment, even in case the piston 320 of the back-pressure valve 300 is fixed to the case 310 due to a jamming occurring between the piston 320 and the case 310, the relief valve 325 can be opened with the oil in the oil chamber 310a, thereby making it possible to prevent the hydraulic cylinder 20 from being made inoperable when the piston 320 of the back-pressure valve 300 is fixed to the case 310.

Thus, as has been described heretofore, since in the back-pressure valve 300, the area A3 of the piston 320 on which oil pressure is received in the oil chamber 310a is larger than the area B3 of the piston 320 on which oil pressure is received in the oil chamber 310b and the part of the piston 320 which is located at the end of the piston 320 which is opposite to the other end thereof which faces the oil chamber 310a is made to communicate with the atmosphere outside the case 310, the difference in pressure of oil can be suppressed which is generated between before and after the passage of oil through the back-pressure valve 300 when oil is normally supplied to the hydraulic cylinder 20 by the pump 33 and the back pressure due to the tank 31 which is pressurized by the accumulator 32 is normally supplied to the hydraulic cylinder 20, and the loss of hydraulic energy can be reduced further when compared with the conventional example.

Consequently, the actuation system according to the embodiment can apply the back pressure to the hydraulic cylinder 20 while reducing the wasteful loss of the hydraulic energy further when compared with the conventional example.

Additionally, with the actuation system according to the embodiment, since the piston 320 of the back-pressure valve 300 does not slide relative to the case 310 after the back-pressure valve 300 has been put in the state shown in FIG. 5 when oil is normally supplied to the hydraulic cylinder 20 by the pump 33 and the back pressure due to the tank 31 which is pressurized by the accumulator 32 is normally supplied to the hydraulic cylinder 20, the durability of the back-pressure valve 300 can be reduced when compared with the conventional example, and as a result, the production costs and weight of the back-pressure valve 300 can be reduced further when compared with the conventional example.

Furthermore, with the actuation system according to the embodiment, since the pump 33 is pressurized by the accumulator 32 and the check valve 36 not only when the pump 33 is driven but also when the pump 33 is stopped, the generation of cavitation can be prevented which occurs on a suction side of the pump 33 when the pump 33 is started to be driven, thereby making it possible to extend the life of the pump 33.

Note that while in the respective embodiments that have been described heretofore, oil is used as a fluid, any other fluids than oil may be used.

As has been described heretofore, the back-pressure valves according to the invention have an advantage that the loss of fluid energy can be reduced further when compared with the conventional example and is useful when applied to back-pressure valves for use in hydraulic circuits in an aircraft.

What is claimed is:

1. A back-pressure valve comprising:
    a case through which fluid passes and including a first fluid chamber and a second fluid chamber therein;
    a piston slidably accommodated within the case so as to partition the first fluid chamber and the second fluid chamber;
    an elastic member for urging the piston in a sliding direction of the piston; and
    a communication device for allowing the first fluid chamber to communicate with the second fluid chamber when a fluid pressure in the first fluid chamber reaches a first predetermined value,
    wherein an area of the piston on which the fluid pressure is received in the first fluid chamber is lager than an area on which a fluid pressure is received in the second fluid chamber, and
    a part of an opposite side of the piston with respect to the first fluid chamber communicates with an outside of the case.

2. A back-pressure valve according to claim 1, wherein the piston has a check valve for preventing a passage of the fluid from the first fluid chamber to the second fluid chamber and a relief valve for allowing the first fluid chamber to communicate with the second fluid chamber when the fluid pressure in the first fluid chamber reaches a second predetermined value which is larger than the first predetermined value, and
    the communication device has the check valve and a valve-opening member adapted to be brought into contact with the check valve so as to open the check valve when the piston is located at a predetermined position.

3. An actuation system comprising a back-pressure valve according to claim 1, an actuator driven by the fluid, and a pressurizing device for pressurizing the fluid in the second fluid chamber,
    wherein the actuator has a discharge port formed therein to discharge the fluid therefrom, and
    the discharge port is made to communicate with the first fluid chamber.

4. A back-pressure valve comprising:
    a case through which fluid passes and in which a first fluid chamber and a second fluid chamber are formed;
    a piston slidably accommodated within the case so as to partition the first fluid chamber and the second fluid chamber;

an elastic member for urging the piston in a sliding direction of the piston; and a communication device for allowing the first fluid chamber to communicate with the second fluid chamber when a fluid pressure in the first fluid chamber reaches a first predetermined value, wherein the piston has a check valve for preventing a passage of the fluid from the first fluid chamber to the second fluid chamber and a relief valve for allowing the first fluid chamber to communicate with the second fluid chamber when the fluid pressure in the first fluid chamber reaches a second predetermined valued which is larger than the first predetermined value, and the communication device has the check valve and a valve-opening member adapted to be brought into contact with the check valve so as to open the check valve when the piston is located at a predetermined position.

5. An actuation system comprising a back-pressure valve according to claim 4, an actuator driven by the fluid, and a pressurizing device for pressurizing the fluid in the second fluid chamber, wherein the actuator has a discharge port formed therein to discharge the fluid therefrom, and the discharge port is made to communicate with the first fluid chamber.

* * * * *